(12) United States Patent
Mauroux et al.

(10) Patent No.: US 10,271,122 B2
(45) Date of Patent: Apr. 23, 2019

(54) MINIATURE AUDIO RECORDER

(71) Applicant: Audio Technology Switzerland S.A., Romanel-sur-Lausanne (CH)

(72) Inventors: Pascal Mauroux, Romanel-sur-Lausanne (CH); Loïc Ray, Romanel-sur-Lausanne (CH); Sebastien Howald, Romanel-sur-Lausanne (CH); Patrick Camina, Romanel-sur-Lausanne (CH); Jean-Francois Herminjard, Romanel-sur-Lausanne (CH)

(73) Assignee: AUDIO TECHNOLOGY SWITZERLAND S.A., Romanel-sur-Lausanne (CH)

( * ) Notice: Subject to any disclaimer, the term of this patent is extended or adjusted under 35 U.S.C. 154(b) by 0 days.

(21) Appl. No.: 15/730,816

(22) Filed: Oct. 12, 2017

(65) Prior Publication Data
US 2018/0109860 A1   Apr. 19, 2018

Related U.S. Application Data

(60) Provisional application No. 62/407,538, filed on Oct. 13, 2016.

(51) Int. Cl.
| | |
|---|---|
| H04R 9/06 | (2006.01) |
| H04R 1/08 | (2006.01) |
| H04R 9/02 | (2006.01) |
| H04R 1/04 | (2006.01) |
| H04R 3/00 | (2006.01) |
| G11B 33/02 | (2006.01) |

(52) U.S. Cl.
CPC .......... H04R 1/083 (2013.01); G11B 33/025 (2013.01); H04R 1/04 (2013.01); H04R 3/00 (2013.01); H04R 9/025 (2013.01); H04R 2201/02 (2013.01); H04R 2499/11 (2013.01)

(58) Field of Classification Search
CPC . H04R 1/02; H04R 9/06; H04R 1/025; H04R 1/026
USPC ............. 381/322, 334, 386, 388, 394, 124.3
See application file for complete search history.

(56) References Cited

U.S. PATENT DOCUMENTS

| | | | | |
|---|---|---|---|---|
| 6,040,978 A | * | 3/2000 | Spencer | G06F 1/1616 361/679.06 |
| 2010/0189296 A1 | * | 7/2010 | Qian | H04R 23/002 381/345 |

(Continued)

*Primary Examiner* — Suhan Ni
(74) *Attorney, Agent, or Firm* — DLA Piper LLP (US)

(57) ABSTRACT

In a modular approach to complement a miniature multimedia recorder with additional components, provision is made for a miniature multimedia recorder set comprising a main device and an additional device, the main device comprising at least a sensor such as an audio or audio/video acquisition unit, a processor, a memory and a battery, and the additional device comprising an optional circuit for the main device, said main device comprising a first housing and said additional device comprising a second housing, characterized in that the first housing or the second housing comprises at least one magnet cooperating with a metallic part on the second or the first housing, respectively, said first and second housing comprising guiding elements to ensure proper positioning between the first and the second housing.

6 Claims, 4 Drawing Sheets

(56) References Cited

U.S. PATENT DOCUMENTS

2015/0098577 A1* 4/2015 Moore .................... G01H 3/00
381/58
2015/0110324 A1* 4/2015 Feng ..................... H04R 1/028
381/334

* cited by examiner

MINIATURE AUDIO RECORDER

CROSS REFERENCE TO RELATED APPLICATIONS

This application claims the benefit of U.S. Provisional Application No. 62/407,538, filed Oct. 13, 2016 which is incorporated by reference in its entirety.

INTRODUCTION

In the field of miniature audio recorders, several challenges are to be solved to place all the components of an audio recorder into a very tiny space. One strategic decision is the capacity of the battery which will define the autonomy of the device and the presence or absence of additional components such as a wireless transmitter.

BACKGROUND ART

The availability of miniature components has opened the possibility to create miniature multimedia recorders such as audio or audio/video recorders. A miniature multimedia recorder comprises at least a sensor (to acquire the audio and/or the video signal), a processor, a storage unit and a battery. Additional circuits could be added such as a wireless transmitter, a wireless receiver to receive signal from a remote control, a GPS to acquire the current location, an additional battery to extend the life of the recorder or an additional memory to extend the duration of the recording.

The autonomy of such a device is one key factor and is determined by various parameters such as the consumption of the different units and/or the battery. In order to keep the volume as small as possible, the size of the battery and the number of additional elements is kept to a minimum. This is why the additional components are usually proposed as options for the main device and provided in a separate housing connected via a suitable connector.

BRIEF DESCRIPTION

In one aspect, a modular approach to complement the miniature multimedia recorder with additional components is presented herein.

Provision is made for a miniature multimedia recorder set comprising a main device and an additional device, the main device comprising a sensor, which may be an audio sensor (e.g., a microphone), a video sensor (e.g., a camera), or both; a processor, a memory and a battery, and the additional device comprising an optional circuit (e.g., see circuits described above) for the main device, said main device comprising a first housing and said additional device comprising a second housing, characterized in that the first housing or the second housing comprises at least one magnet cooperating with a metallic part on the second or the first housing, respectively, said first and second housing comprising guiding elements to ensure proper positioning between the first and the second housing.

The first and second housing further comprises contacts cooperating with each other such that, when the first housing is magnetically connected to the second housing, the contacts on the first housing are electrically connected to the contacts on the second housing. For this purpose, at least one set of contacts, located in the first or the second housing have an adjustable length in order to create a pressure between the contacts when the first and the second housings are attached together.

BRIEF DESCRIPTION OF THE FIGURES

The present invention will be better understood thanks to the attached figures in which.

DETAILED DESCRIPTION

Figure 1:
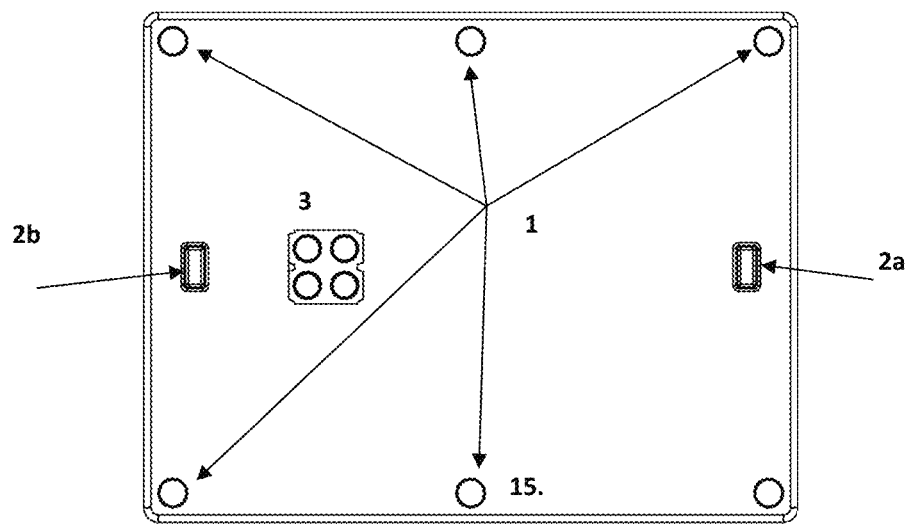
FIG. 1 illustrates a top view of the main device

The present description will be given in reference with an audio recorder, but the same description applies to an audio/video recorder. FIG. 1 illustrates a top view of one of the faces of the audio recorder.

The audio recorder comprises various components such as the microphone, the audio processor, the memory and the battery. These components are located within a first housing (6) illustrated in FIG. 2. This first housing (6) in the present illustrations is rectangular but the shape has no importance, the only condition is that the second housing (16) of the additional device fits with the first housing (1). A first cover (15) of the main device is intended to be in contact with the additional device.

The first housing (6) is magnetically mounted with the second housing (16). For this purpose, various solutions can be used with one or more magnets on one of the housings and one or more corresponding metallic parts on the other housing, or one or more magnets on both housings, with magnets on one housing being of an opposite polarity to corresponding magnets on the other housing. The housings are preferably made of a non-magnetic material such as aluminium or plastic to prevent the magnet from sticking to a place where it is not intended. In the examples below, we will take the option of a magnet on the main device and a corresponding metallic part of the additional device. However, the other solutions mentioned above are applicable as well.

In FIG. 1, several magnets (1) are placed on the periphery of the first housing (6). This ensures a smooth mounting with the second housing (not shown in FIG. 1). The first housing (6) further contains at least one recess (2a, 2b) to receive a guide which is part of the second housing. The recess and guide pair ensures that proper positioning is made between the first and second housings. Preferably, two recess/guide pairs are used to position and align the second housing with the first housing.

The first housing (6) further contains electrical contacts (3) to connect with corresponding electrical contacts of the second housing.

Figure 2:
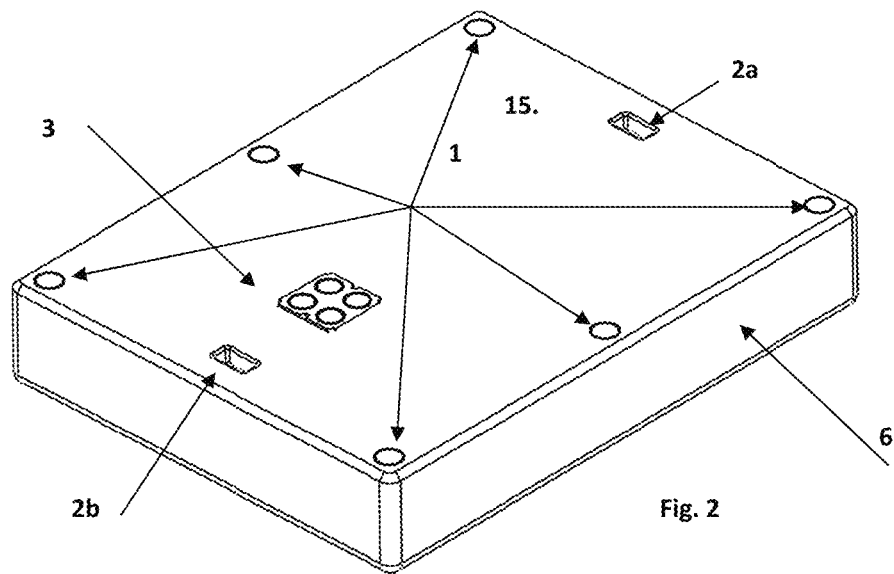
FIG. 2 illustrates a perspective view of the main device.

FIG. 2 illustrates a perspective view of the first housing (6). The contacts (3) preferably do not protrude beyond the surface of the first housing. The first housing (6) comprises a first connector to transmit the data of the internal memory (not represented). One example of the connector is a USB connector using an USB protocol to transmit the audio data to a host. It is to be noted that this connector could be also used to configure the audio recorder.

Another connector can be used to connect an external microphone.

Figure 3:
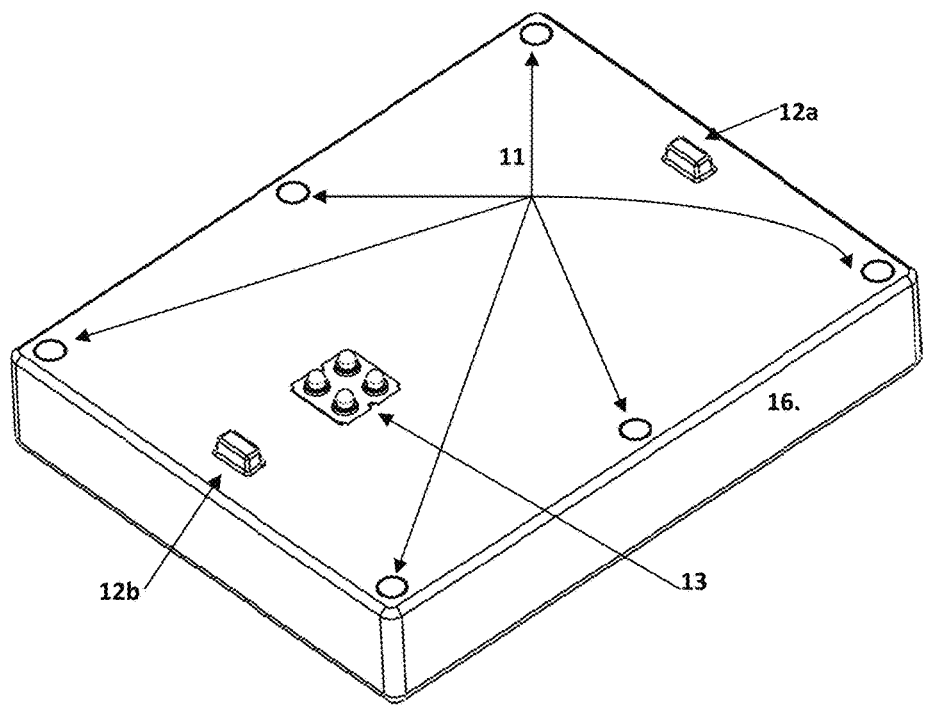
FIG. 3 illustrates a perspective view of the additional device.

In FIG. 3, the additional device is illustrated by a perspective view. This device comprises a second housing (16). The metallic parts (11) of the second housing (16) are placed so that they are aligned with the magnets of the first housing. The guides (12a, 12b) are also visible on the second housing and protrude beyond the surface of the second housing (16) and are located at positions on the second surface which correspond to the positions of the recesses of the first housing (6) when the multimedia recorder set is properly mounted. The second housing (16) further comprises a set of contacts (13) intended to be in contact with the contacts (3) of the first housing. These contacts have an adjustable length so that when the main device is mounted with the additional device, the length of the contacts on the second housing are adjusted to press against the contacts on the first housing.

Figure 4:
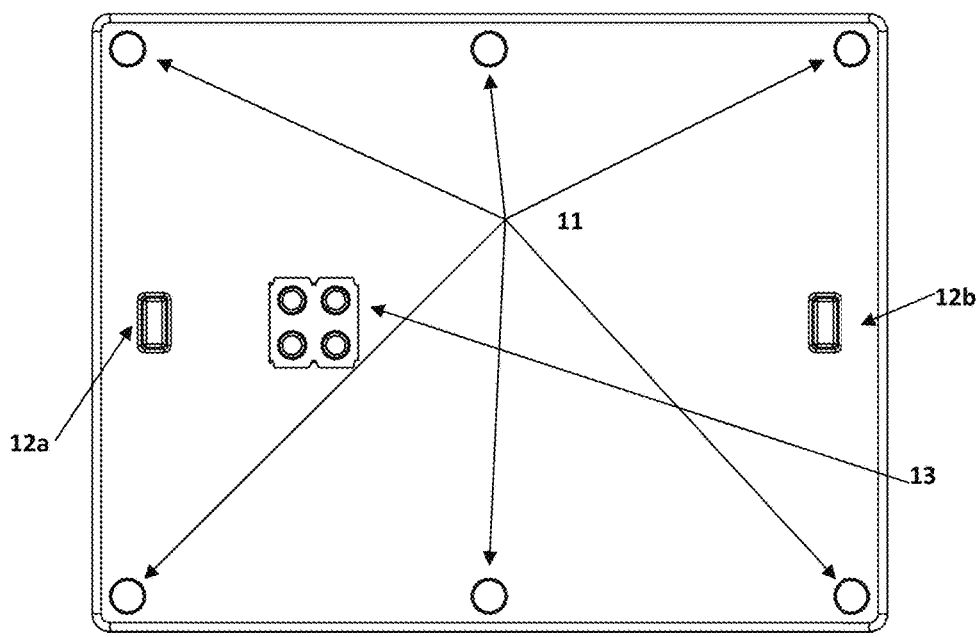
FIG. 4 illustrates a top view of the additional device.

FIG. 4 is a top view of the additional device having a second housing (16). The metallic parts (11) are clearly visible and placed on the periphery of the second housing so that they correspond with the magnets of the first housing.

Figure 5:
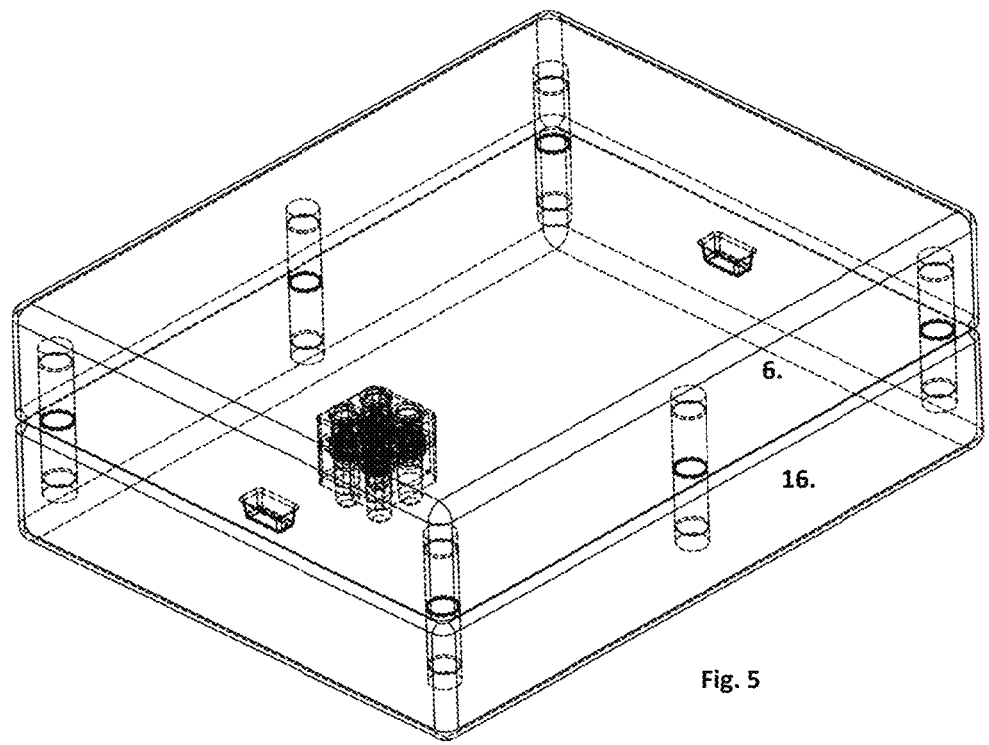
FIG. 5 illustrates the set comprising the main and the additional device connected together.
Figure 6:
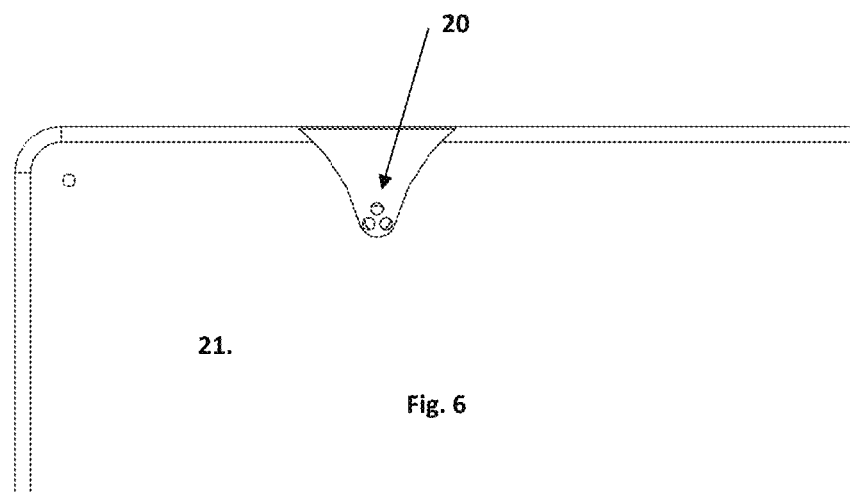
FIG. 6 illustrates the microphone slit on the main device.

FIG. 5 illustrates the set comprising the main device (6) mounted with the additional device (16). According to one example the additional device can contain an additional battery to extend the life of the main device. Alternatively, the additional device could be a GPS to transmit the current location to the main device. Other functions can be foreseen for the additional device such as an additional memory to extend the storage capacity of the main device.

According to one embodiment, the additional device can further contain the elements illustrated on the top view of the main device. On the opposite side as the one illustrated by FIG. 4, the additional device can comprise contacts, magnets and recesses designed to connect with a second additional device.

One aspect of the present invention is the positioning of the microphone. For easy mounting on the circuit board of the main device, the built-in microphone is mounted perpendicular to the circuit board and just below the second cover (21) of the first housing (6). The first housing has a parallelepiped shape formed by a first cover having the at least one magnet and a second cover (21), opposite to the first cover (15), and four sides. In case where the main device is placed on a flat surface, the holes in the second cover for capturing the sound are covered and no sound can be recorded. This is why the second cover (21) comprises a recess (20) extending to the side of the first housing (6), this recess being preferably bell-shaped. The holes are located inside the recesses so that even if the second cover (21) is placed on another surface, the sound can travel from the side of the first housing up to the holes.

Figure 7:
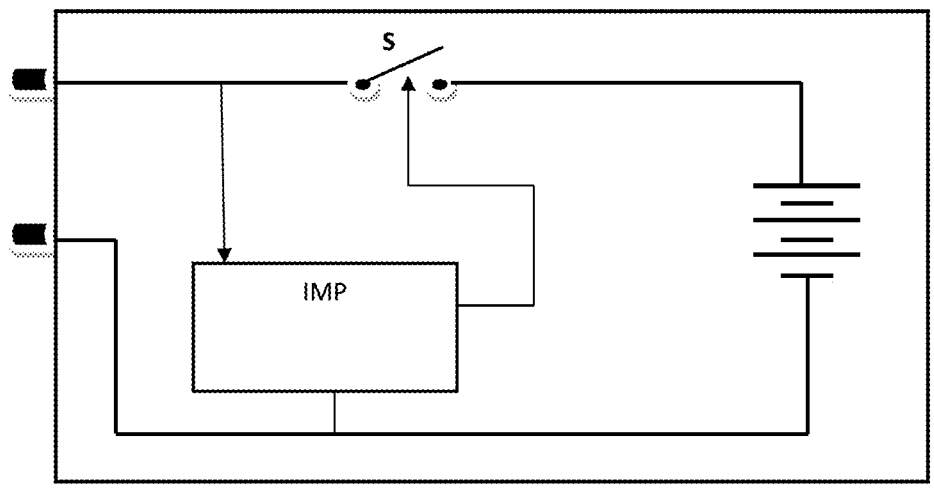
FIG. 7 illustrates a protection circuit for the contacts

According to one aspect of the present invention, as illustrated in FIG. 7, at least some of the contacts are protected by a controlled electronic switch (S). Since the contacts are directly accessible on the housing, it is easy to create a shortcut between two contacts. This is why an electronic switch such as a MOSFET is used to isolate the contacts from the inside element. In FIG. 7, the inside element is a battery and it is easy to understand that a short circuit between the two contacts can harm the battery.

The protection circuit comprises the switch (S) under the control of an impedance measurement circuit (IMP). This circuit measures the impedance between two contacts and activates the switch (S) if the impedance is within a predefined range. When the contacts are open-circuited the impedance is near to infinite. When the contacts are short circuited the impedance is nearly zero. The impedance measurement circuit (IMP) detects these two states and keeps the switch (S) open. In the case where the impedance is within a range compatible with the expected load, the switch is closed.

To measure the impedance, a small current is applied on one of the contact and the resulting voltage is measured. In case of a shortcut, the voltage at the contact will be near zero. In this case the switch (S) remains open. In case that a load is connected to the contact, the voltage will be above zero depending on the resistance of the load. A detector is placed in the impedance measurement circuit (IMP) and commands the switch (S) should the load being within authorized limits.

Since the measurements described above will use power from the battery, the impedance measurement circuit (IMP) comprises a timer that places the electronic components in idle mode most of the time. At regular interval, the timer powers the electronic components to carry out the impedance measurement. The measurement last only several milliseconds and are executed every 250 to 500 ms (for example).

Figure 8:
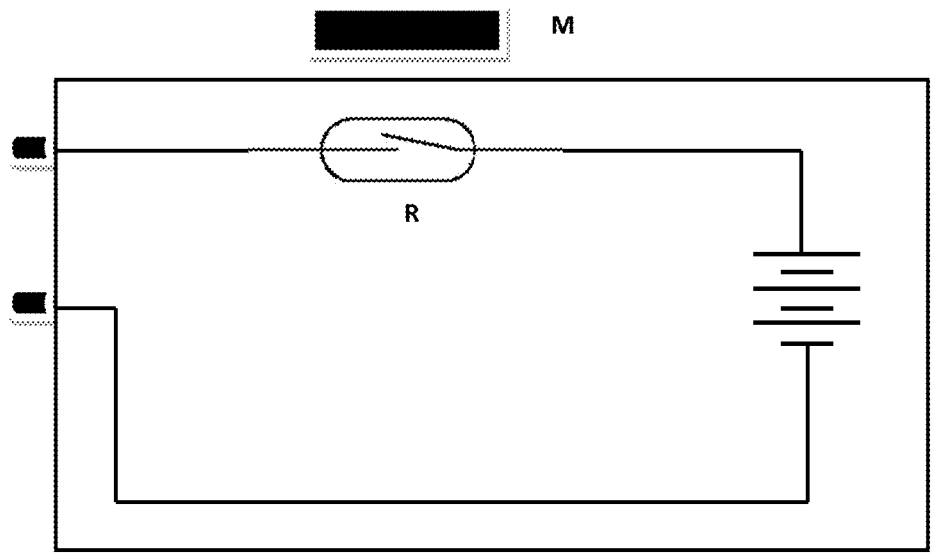
FIG. 8 illustrates an alternate protection method for the contacts.

An alternate embodiment is illustrated by the FIG. 8. The battery of the additional device is protected by a reed relay (R). Once both housings are mounted together, one of the magnets (M) (or a dedicated magnet) of the main device closes the reed relay and the battery is connected across the contacts.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

Although the detailed description above contains many specific details, these should not be construed as limiting the scope of the embodiments but as merely providing illustrations of some of several embodiments.

In addition, it should be understood that any figures which highlight the functionality and advantages are presented for example purposes only. The disclosed methods are sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware unit may be implemented mechanically, electronically, or any suitable combination thereof. For example, a hardware unit may include dedicated circuitry or logic that is permanently configured to perform certain operations. For example, a hardware unit may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A miniature multimedia recorder set comprising:
a main device comprising at least a first housing, a sensor, a processor, a memory and a battery; and
an additional device comprising a second housing and optional circuit for the main device disposed within the second housing:
wherein that the first housing or the second housing comprises at least one magnet cooperating with a magnet or a metallic part on the second or the first housing, respectively, said first and second housing comprising guiding elements to ensure proper positioning between the first and the second housing;
wherein the first housing has a parallelepiped shape formed by a first cover having the at least one magnet and a second cover, opposite to the first cover, and four sides, and wherein the main device comprises a built-in microphone extending close to the surface of the second cover, further comprising a recess extending to one of the sides of the first housing.

2. The miniature multimedia recorder set of claim 1, wherein the magnets are located at the periphery of the first or second housing.

3. The miniature multimedia recorder set of claim 1, wherein the magnets on first housing have opposite polarities from the magnets on the second housing.

4. The miniature multimedia recorder set of claim 1, wherein the first and second housing further comprise contacts cooperating with each other such that, when the first housing is magnetically connected to the second housing, the contacts on the first housing are electrically connected to the contacts on the second housing.

5. The miniature multimedia recorder set of claim 4, wherein the main device or the additional device comprises a protection circuit for at least one contact, said protection circuit comprising a switch to isolate the contact to internal elements of the main device or the additional device, and further comprising an impedance measurement circuit to detect a load on the contact and open/close the switch as a function of the measured load.

6. The miniature multimedia recorder set of claim 1, wherein this recess is bell-shaped.

* * * * *